United States Patent [19]

Mihara

[11] Patent Number: 4,568,151
[45] Date of Patent: Feb. 4, 1986

[54] PHOTOGRAPHIC LENS SYSTEM
[75] Inventor: Shin-ichi Mihara, Tokyo, Japan
[73] Assignee: Olympus Optical Co., Ltd., Tokyo, Japan
[21] Appl. No.: 592,085
[22] Filed: Mar. 22, 1984
[30] Foreign Application Priority Data Mar. 29, 1983 [JP] Japan .................... 58-51419

[51] Int. Cl.$^4$ .............................. G02B 9/34
[52] U.S. Cl. ................... 350/469; 350/450; 350/471
[58] Field of Search ............ 350/469, 471, 450
[56] References Cited

U.S. PATENT DOCUMENTS

| | | | |
|---|---|---|---|
| 2,670,659 | 3/1954 | Tronnier | 350/469 |
| 4,235,521 | 11/1980 | Imai | |
| 4,303,313 | 12/1981 | Imai et al. | |
| 4,389,099 | 6/1983 | Imai | 350/464 |
| 4,390,250 | 6/1983 | Imai | 350/464 |
| 4,456,345 | 6/1984 | Fujibayashi | 350/469 |

FOREIGN PATENT DOCUMENTS

| | | |
|---|---|---|
| 54-76147 | 6/1979 | Japan . |
| 55-73014 | 6/1980 | Japan . |
| 57-30814 | 2/1982 | Japan . |
| 57-22215 | 2/1982 | Japan . |

Primary Examiner—John K. Corbin
Assistant Examiner—Rebecca D. Gass
Attorney, Agent, or Firm—Cushman, Darby & Cushman

[57] ABSTRACT

A photographic lens system for compact cameras comprising a first positive meniscus lens component having a convex surface on the object side, a second lens component having negative refractive power, a third lens component having positive refractive power and a fourth negative meniscus lens component having a convex surface on the image side, at least one of said four lens components being a cemented doublet. Said photographic lens system has a relative aperture of F/2.8, aberrations corrected sufficiently favorably and a short total length.

13 Claims, 12 Drawing Figures

PHOTOGRAPHIC LENS SYSTEM

BACKGROUND OF THE INVENTION (a) Field of the Invention

The present invention relates to a lens system for compact cameras having a short total length, and more specifically to a photographic lens system having a field angle of at least 60°, an F number of 2.8, a telephoto ratio smaller than 0.1 and a very short total length.

(b) Description of the Prior Art

Lens systems for use with compact cameras which use 35 mm size of films generally have field angles around 63°. In order to design lens systems of this class so as to have telephoto ratios smaller than 0.1 and very short total length, it is necessary to locate the back principal point of the lens systems on the object side of the first lens surface. In order to realize such a location of the back principal point, it is considered to adopt the type generally used as telephoto lens systems in which the front lens group is designed as a deverging lens group and the rear lens group is designed as a converging lens group. As a conventional example of this type of lens system, there has already been known the one disclosed by Japanese Unexamined Published Patent Application No. 76147/79. This lens system has a filed angle of 63°, an F number of 2.8, a telephoto ratio smaller than 1.0 and favorably corrected aberrations. However, this lens system is not so compact since it comprises a positive lens component having a large diameter. Lens systems similar to this lens system are disclosed by Japanese Unexamined Published Patent Application No. 22215/82 and No. 30814/82. These conventional examples also have a tendency similar to that of the one disclosed by Japanese Unexamine Published Patent Application No. 76147/79.

As an improved type of the above-mentioned conventional example, Japanese Unexamined Published Patent Application No. 73014/80 discloses a lens system comprising a concave lens component arranged on the extreme image side. This lens system comprises four lens components, i.e., a first positive meniscus lens component having a convex surface on the object side, a second biconcave lens component, a third biconvex lens component and a fourth negative meniscus lens component having a convex surface on the image side. Said lens system has a field angle of 63°, a telephoto ratio smaller than 1.0 and favorably corrected aberrations, and diameter of said lens component arranged on the extreme image side is not so large. However, the lens system has an F number of 3.5 and a relative aperture which is smaller than those of the other conventional examples. If it is attempted to enlarge the relative aperture of this lens system to an F number of 2.8, high order spherical aberration will be remarkably aggravated, and if it is attempted to correct the aberrations with the telephoto ratio and field angle maintained at 0.1 and 60° or wider respectively, it will be impossible to maintain good balance among the aberrations.

SUMMARY OF THE INVENTION

A general object of the present invention is to provide a photographic lens system for compact cameras comprising four components of four lens elements, and having F/2.8, sufficiently corrected aberrations and a short total length without enlarging diameter of the lens component arranged on the extreme image side and without using aspherical lens surface requiring difficult machining.

When the relative aperture of the above-mentioned example is enlarged to F/2.8, spherical aberration is remarkably aggravated by the peripheral portion of the object side surface of the second lens component. If it is attempted to correct this high order spherical aberration without changing the lens composition of four components of four lens elements, the rear lens group will have higher diverging function, thereby aggravating pin cushion distortion and astigmatic difference. Therefore, it is necessary to adopt such a lens composition as to cancel the higher order aberration produced by the object side surface of the second lens component with the other lens surfaces without aggravating the other aberrations, another lens composition wichi minimizes the high order aberration itself produces by the object side surface of the second lens component, or a composite type of the above-mentioned two lens compositions.

The lens system according to the present invention is so designed as to minimize to a certain degree the high order aberration produced by the object side surface of the second lens component by adopting cemented doublet as at least one of the four lens components, and to correct all the aberrations with good balance by correcting said high order aberration with the image side surface of the third lens component which is apt to produce high order aberration opposite to that produced by the object side surface of the second lens component and by correcting the other aberrations produced by the image side surface of the third lens component with the cemented surface of the cemented doublet.

The lens system according to the present invention comprises a first positive meniscus lens component having a convex surface on the object side, a second lens component having negative refractive power, a third lens component having positive refractive power and a fourth negative meniscus lens component having a convex surface on the image sides arranged sequentially from the object side, at least one of said four lens components being designed as a cemented doublet. The lens system according to the present invention is so designed as to satisfy the following conditions (1) through (3):

$$0.15f < |r_{ci}| < 0.5f \tag{1}$$

$$0.23f < r_1 < 0.4f \tag{2}$$

$$1.5 < |r_a/r_b| < 5.5 \tag{3}$$

wherein the reference symbols are defined as follows:
  $r_1$: radius of curvature on the object side surface of said first lens component
  $r_a$: radius of curvature on the object side surface of said second lens component
  $r_b$: radius of curvature on the image side surface of said third lens component
  $r_{ci}$: (i=1, 2, . . . meaning ith cemented surface as counted from the object side) radius of curvature on the cemented surface of said cemented doublet
  f: focal length of the lens system as a whole The condition (1) defines radius of curvature $r_{ci}$ on the cemented surface having relation to correction of the high order aberration. A relatively small value of the radius of curvature $r_{ci}$ is advantageous for correcting the high order aberration. However, if $r_{ci}$ is smaller than the lower limit 0.15f of the condition (1), said cemented doublet component must have a large thickness around the optical axis to impart peripheral thickness to the convex lens element of said cemented doublet component, but such a large thickness is undesirable for correction of aberrations. If $r_{ci}$ exceeds the upper limit 0.5f of the condition (1), in contrast, it will be impossible to correct the high order aberration sufficiently.

The condition (2) defines radius of curvature on the object side surface of the first lens component. This condition is necessary to obtain a telephoto ratio of 1 or smaller and correct aberrations favorably. If $r_1$ is smaller than 0.23f defined as the lower limit of this condition, it is possible to shorten total length of the lens system as a whole, but negative spherical aberration will be produced remarkably by said lens surface and radius of curvature on the extreme object side surface of the second lens component must be reduced to correct said aberration. In such a case, the high order aberration will likely to be produced as an undesirable result. If $r_1$ exceeds 0.4f, in contrast, it will be difficult to obtain a telephoto ratio smaller than 1.

The condition (3) defines the ratio of radius of curvature $r_a$ on the extreme object side surface of the second lens component relative to radius of curvature $r_b$ on the extreme image side surface of the third lens component. The condition (3) is necessary to correct the high order aberration. If the ratio $|r_a/r_b|$ is smaller than 1.5 defined as the lower limit of the condition (3), the high order aberration will be remarkably aggravated. If the ratio exceeds 5.5, in contrast, it well be easy to minimize the high order spherical aberration, but the other high order components will undesirably be produced.

Further, it is more desirable for more favorable correction of aberrations to design said radius of curvature $r_a$ so as to satisfy the following condition:

$$0.7f < |r_a| < 5.0f$$

In the lens system according to the present invention, it is desirable to arrange cemented surface in the second lens component, third lens component or both thereof from viewpoints of correction of aberrations and machining of the lens elements. The high order spherical aberration can be corrected without aggravating the other aberrations by selecting power of the cemented surface adequately depending on locations and directions of said cemented surfaces. For this reason, it is desirable to define power of the cemented surface so as to satisfy the following condition (4) when the cemented surface is arranged in the second lens component and its convex surface is located on the object side, the following condition (5) when the cemented surface is arranged in the second lens component and its convex surface is located on the image side, the following condition (6) when the cemented surface is arranged in the third lens component and its convex surface is located on the object side, or the following condition (7) when the cemented lens surface is arranged in the third lens component and its convex surface is located on the image side:

$$-0.95 < (n_T - n_O) \cdot f/r_{C1} < -0.65 \quad (4)$$

$$-0.65 < (n_O - n_T) \cdot f/r_{C1} < -0.35 \quad (5)$$

$$0.15 < (n_T - n_O) \cdot f/r_{C1} < 0.45 \quad (6)$$

$$0.10 < (n_O - n_T) \cdot f/r_{C1} < 0.35 \quad (7)$$

wherein the reference symbols $n_T$ and $n_O$ represent refractive indices of the positive and negative lens elements respectively of the cemented doublet, and the reference symbol $r_{C1}$ designates refractive index of the cemented surface.

If the upper limit of the condition (4) or (5) is exceeded or if the lower limit of the condition (6) or (7) is exceeded, the cemented surface will have too weak power and its aberration correcting function will be too weak for correcting the high order spherical aberration sufficiently. If the lower limit of the condition (4) or (5) is exceeded, or if the upper limit of the condition (6) or (7) is exceeded, in contrast, high order components of astigmatism and coma will undesirably be increased.

DETAILED DESCRIPTION OF THE PREFERRED EMBODIMENTS

Figure 1:
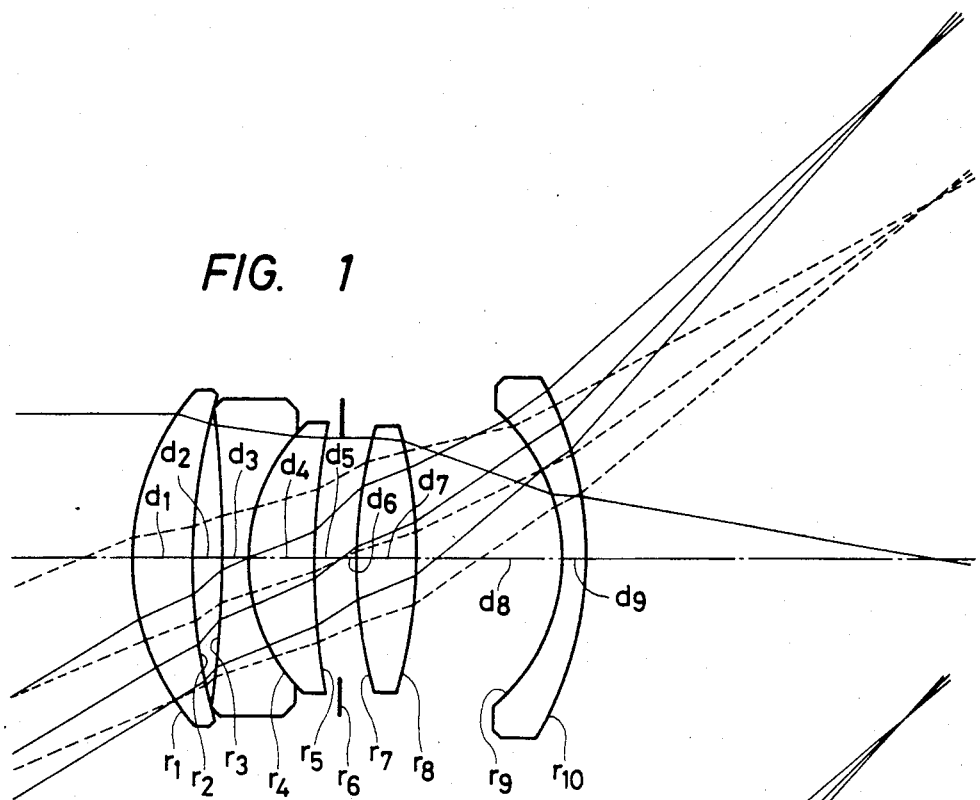
FIG. 1 shows a sectional view illustrating composition of Embodiment 1 of the lens system according to the present invention.

Now, numerical data of the lens system according to the present invention will be described as preferred embodiments thereof:

| Embodiments 1 |
| --- |
| $f = 10.0, \quad F/2.8, \quad 2\omega = 63°$ |

$r_1 = 3.0633$
$d_1 = 0.7537 \quad n_1 = 1.83481 \quad \nu_1 = 42.7$
$r_2 = 7.2612$
$d_2 = 0.3624$
$r_3 = -12.7939$
$d_3 = 0.2899 \quad n_2 = 1.78472 \quad \nu_2 = 25.7$
$r_4 = 2.3634$
$d_4 = 0.8117 \quad n_3 = 1.59270 \quad \nu_3 = 35.3$
$r_5 = 9.6117$
$d_5 = 0.3104$
$r_6 = \infty$ (stop)
$d_6 = 0.1839$
$r_7 = 5.7283$
$d_7 = 0.7247 \quad n_4 = 1.62588 \quad \nu_4 = 35.7$
$r_8 = -5.9487$
$d_8 = 1.8223$
$r_9 = -2.3029$
$d_9 = 0.2899 \quad n_5 = 1.77250 \quad \nu_5 = 49.6$
$r_{10} = -4.3465$
$|r_{C1}| = |r_4| = 2.3634, \; r_a/r_b = r_3/r_8 = 2.1507$
$(n_T - n_O) \cdot f/r_{C1} = (n_3 - n_2) \cdot f/r_4 = -0.81247$
telephoto ratio 0.9797

| Embodiment 2 |
| --- |
| $f = 10.0, \quad F/2.8, \quad 2\omega = 63°$ |

$r_1 = 2.9677$
$d_1 = 0.8261 \quad n_1 = 1.72916 \quad \nu_1 = 54.7$
$r_2 = 6.1374$
$d_2 = 0.4058$
$r_3 = -9.5332$

Embodiment 2

| | | |
|---|---|---|
| $d_3 = 0.7246$ | $n_2 = 1.61700$ | $\nu_2 = 62.8$ |
| $r_4 = -4.6128$ | | |
| $d_4 = 0.2899$ | $n_3 = 1.84666$ | $\nu_3 = 23.9$ |
| $r_5 = 22.6623$ | | |
| $d_5 = 0.3085$ | | |
| $r_6 = \infty$ (stop) | | |
| $d_6 = 0.1668$ | | |
| $r_7 = 5.5458$ | | |
| $d_7 = 0.7536$ | $n_4 = 1.59270$ | $\nu_4 = 35.3$ |
| $r_8 = -5.0312$ | | |
| $d_8 = 1.3095$ | | |
| $r_9 = -1.9877$ | | |
| $d_9 = 0.2899$ | $n_5 = 1.65160$ | $\nu_5 = 58.6$ |
| $r_{10} = 4.3896$ | | |

$|r_{C1}| = |r_4| = 4.6128$, $r_a/r_b = r_3/r_8 = 1.8948$
$(n_O - n_T) \cdot f/r_{C1} = (n_3 - n_2) \cdot f/r_4 = -0.49788$
telephoto ratio 0.9797

Embodiment 3

$f = 10.0$, $F/2.8$, $2\omega = 63°$

| | | |
|---|---|---|
| $r_1 = 3.1498$ | | |
| $d_1 = 0.8187$ | $n_1 = 1.72916$ | $\nu_1 = 54.7$ |
| $r_2 = 7.7620$ | | |
| $d_2 = 0.2632$ | | |
| $r_3 = -22.5988$ | | |
| $d_3 = 0.2924$ | $n_2 = 1.84666$ | $\nu_2 = 23.9$ |
| $r_4 = 10.6345$ | | |
| $d_4 = 0.4587$ | | |
| $r_5 = \infty$ (stop) | | |
| $d_5 = 0.5438$ | | |
| $r_6 = 9.2066$ | | |
| $d_6 = 0.2632$ | $n_3 = 1.51742$ | $\nu_3 = 52.4$ |
| $r_7 = 2.1659$ | | |
| $d_7 = 0.9213$ | $n_4 = 1.58875$ | $\nu_4 = 51.2$ |
| $r_8 = -10.3153$ | | |
| $d_8 = 1.5345$ | | |
| $r_9 = -1.9663$ | | |
| $d_9 = 0.2924$ | $n_5 = 1.56873$ | $\nu_5 = 63.1$ |
| $r_{10} = -3.5151$ | | |

$|r_{C1}| = |r_7| = 2.1659$, $r_a/r_b = r_3/r_8 = 2.1908$
$(n_T - n_O) \cdot f/r_{C1} = (n_4 - n_3) \cdot f/r_7 = 0.32933$
telephoto ratio 0.9883

Embodiment 4

$f = 10.0$, $F/2.8$, $2\omega = 63°$

| | | |
|---|---|---|
| $r_1 = 3.1087$ | | |
| $d_1 = 0.7895$ | $n_1 = 1.81600$ | $\nu_1 = 46.6$ |
| $r_2 = 8.6269$ | | |
| $d_2 = 0.2924$ | | |
| $r_3 = -45.8471$ | | |
| $d_3 = 0.2924$ | $n_2 = 1.84666$ | $\nu_2 = 23.9$ |
| $r_4 = 5.4974$ | | |
| $d_4 = 0.4587$ | | |
| $r_5 = \infty$ (stop) | | |
| $d_5 = 0.3811$ | | |
| $r_6 = 7.0711$ | | |
| $d_6 = 0.2632$ | $n_3 = 1.51742$ | $\nu_3 = 52.4$ |
| $r_7 = 2.3253$ | | |
| $d_7 = 1.1697$ | $n_4 = 1.58267$ | $\nu_4 = 46.3$ |
| $r_8 = -8.9675$ | | |
| $d_8 = 1.3826$ | | |
| $r_9 = -2.0356$ | | |
| $d_9 = 0.3509$ | $n_5 = 1.72916$ | $\nu_5 = 54.7$ |
| $r_{10} = -3.2616$ | | |

$|r_{C1}| = |r_7| = 2.3253$, $r_a/r_b = r_3 r_8 = 5.1126$
$(n_T - n_O) \cdot f/r_{C1} = (n_4 - n_3) \cdot f/r_7 = 0.28061$
telephoto ratio 0.9883

Embodiment 5

$f = 10.0$, $F/2.8$, $2\omega = 63°$

| | | |
|---|---|---|
| $r_1 = 3.1551$ | | |
| $d_1 = 0.7895$ | $n_1 = 1.72916$ | $\nu_1 = 54.7$ |
| $r_2 = 8.5918$ | | |
| $d_2 = 0.2924$ | | |
| $r_3 = -23.2949$ | | |
| $d_3 = 0.2924$ | $n_2 = 1.84666$ | $\nu_2 = 23.9$ |
| $r_4 = 9.3780$ | | |
| $d_4 = 0.4587$ | | |
| $r_5 = \infty$ (stop) | | |
| $d_5 = 0.5268$ | | |
| $r_6 = 7.9042$ | | |
| $d_6 = 0.2632$ | $n_3 = 1.51633$ | $\nu_3 = 64.2$ |
| $r_7 = 2.1197$ | | |
| $d_7 = 1.1696$ | $n_4 = 1.58904$ | $\nu_4 = 53.2$ |
| $r_8 = -9.5086$ | | |
| $d_8 = 1.3818$ | | |
| $r_9 = -2.0110$ | | |
| $d_9 = 0.3509$ | $n_5 = 1.72916$ | $\nu_5 = 54.7$ |
| $r_{10} = -3.5087$ | | |

$|r_{C1}| = |r_7| = 2.1197$, $r_a/r_b = r_3/r_8 = 2.4499$
$(n_T - n_O) \cdot f/r_{C1} = (n_4 - n_3) \cdot f/r_7 = 0.34302$
telephoto ratio 0.9883

Embodiment 6

$f = 10.0$, $F/2.8$, $2\omega = 63°$

| | | |
|---|---|---|
| $r_1 = 3.1198$ | | |
| $d_1 = 0.8189$ | $n_1 = 1.72916$ | $\nu_1 = 54.7$ |
| $r_2 = 7.9231$ | | |
| $d_2 = 0.3510$ | | |
| $r_3 = -11.9395$ | | |
| $d_3 = 0.2925$ | $n_2 = 1.78472$ | $\nu_2 = 25.7$ |
| $r_4 = 7.9115$ | | |
| $d_4 = 0.4588$ | | |
| $r_5 = \infty$ (stop) | | |
| $d_5 = 0.2682$ | | |
| $r_6 = 4.6559$ | | |
| $d_6 = 1.0529$ | $n_3 = 1.56013$ | $\nu_3 = 47.0$ |
| $r_7 = -3.9317$ | | |
| $d_7 = 0.3802$ | $n_4 = 1.50048$ | $\nu_4 = 65.9$ |
| $r_8 = -6.6722$ | | |
| $d_8 = 1.4007$ | | |
| $r_9 = -2.0354$ | | |
| $d_9 = 0.3510$ | $n_5 = 1.72916$ | $\nu_5 = 54.7$ |
| $r_{10} = -3.8246$ | | |

$|r_{C1}| = |r_7| = 3.9317$, $r_a/r_b = r_3/r_8 = 3.0367$
$(n_O - n_T) \cdot f/r_{C1} = (n_4 - n_3) \cdot f/r_7 = 0.15172$
telephoto ratio 0.9884

Embodiment 7

$f = 10.0$, $F/2.8$, $2\omega = 63°$

| | | |
|---|---|---|
| $r_1 = 3.0426$ | | |
| $d_1 = 0.8187$ | $n_1 = 1.77250$ | $\nu_1 = 49.7$ |
| $r_2 = 7.1238$ | | |
| $d_2 = 0.2632$ | | |
| $r_3 = -26.4685$ | | |
| $d_3 = 0.2924$ | $n_2 = 1.72825$ | $\nu_2 = 28.5$ |
| $r_4 = 3.9081$ | | |
| $d_4 = 0.7310$ | $n_3 = 1.48749$ | $\nu_3 = 70.2$ |
| $r_5 = 27.2801$ | | |
| $d_5 = 0.3801$ | | |
| $r_6 = \infty$ (stop) | | |
| $d_6 = 0.2865$ | | |
| $r_7 = 28.2087$ | | |
| $d_7 = 0.2632$ | $n_4 = 1.47069$ | $\nu_4 = 67.4$ |
| $r_8 = 2.7853$ | | |
| $d_8 = 0.9211$ | $n_5 = 1.63930$ | $\nu_5 = 44.9$ |
| $r_9 = -9.8326$ | | |
| $d_9 = 1.2270$ | | |
| $r_{10} = -2.0517$ | | |
| $d_{10} = 0.2924$ | $n_6 = 1.88300$ | $\nu_6 = 40.8$ |
| $r_{11} = -3.2353$ | | |

$|r_{C1}| = |r_4| = 3.9081$, $|r_{C2}| = |r_8| = 2.7853$
$r_a/r_b = r_3/r_9 = 2.6919$

-continued

Embodiment 7 telephoto ratio 0.9883 wherein the reference symbols $r_1$, $r_2$, ... represent radii of curvature on the surfaces of the respective lens elements, the reference symbols $d_1$, $d_2$, ... designate thicknesses of the respective lens elements and airspaces reserved therebetween, the reference symbols $n_1$, $n_2$, ... denote refractive indices of the respective lens elements and the reference symbols $\nu_1$, $\nu_2$, ... represent Abbe's numbers of respective lens elements.

Out of the Embodiments described above, the Embodiment 1 has the lens composition illustrated in FIG. 1 in which the second lens component is designed as a cemented doublet having a cemented surface convex on the object side. Therefore, power of this cemented surface is so set as to satisfy the condition (4).

Figure 2:
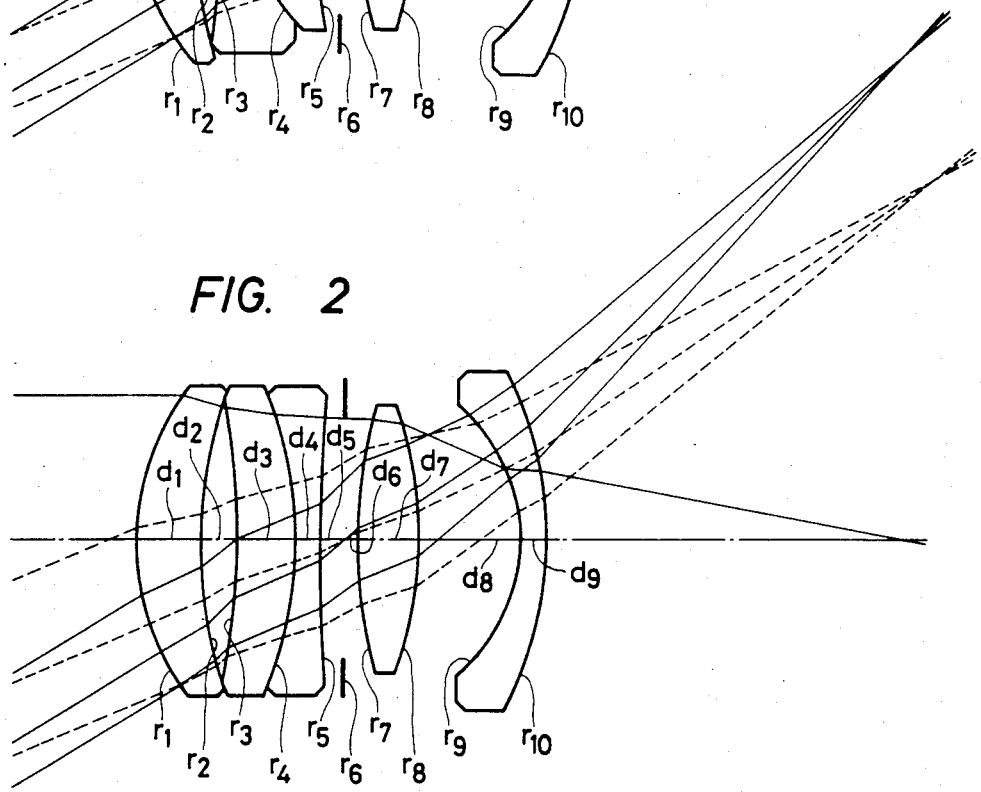
FIG. 2 shows a sectional view illustrating composition of Embodiment 2 of the present invention.
Figure 3:
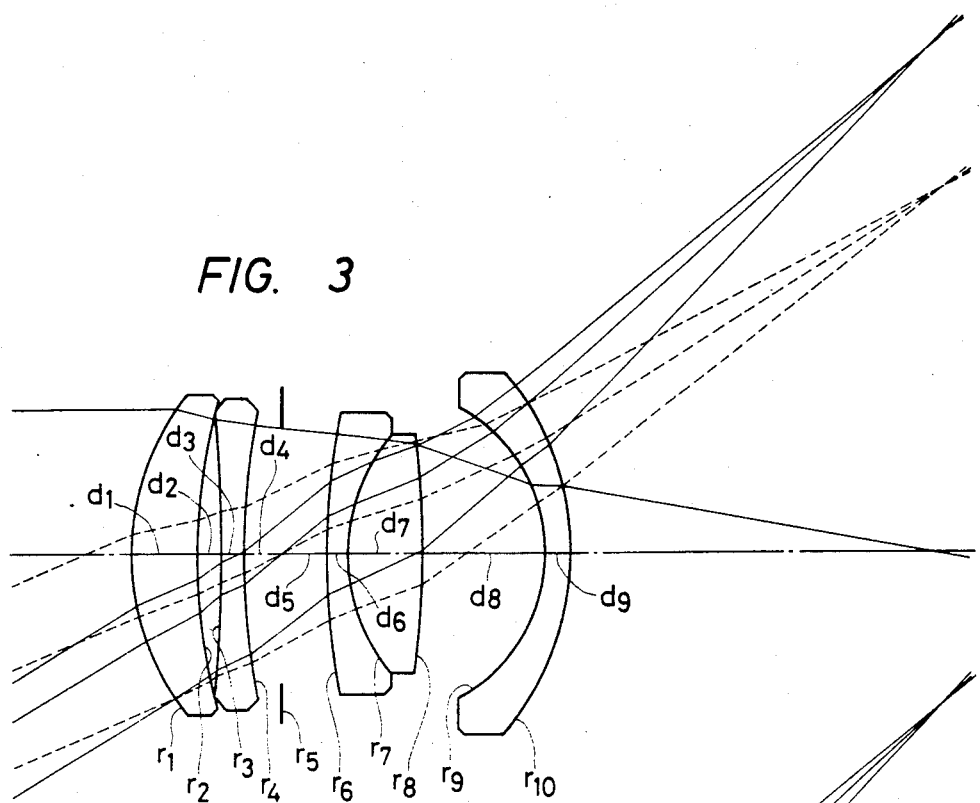
FIG. 3 shows a sectional view illustrating composition of Embodiments 3, 4 and 5 of the present invention.

The Embodiment 2 has the lens composition illustrated in FIG. 2 in which the second lens component is designed as a cemented doublet having cemented surface convex on the image side. Power of this cemented surface is so set as to satisfy the condition (5). Each of the Embodiments 3 through 5 has the lens composition illustrated in FIG. 3 in which the third lens component is designed as a cemented doublet having cemented surface convex on the object side. Power of this cemented surface is so set as to satisfy the condition (6).

Figure 4:
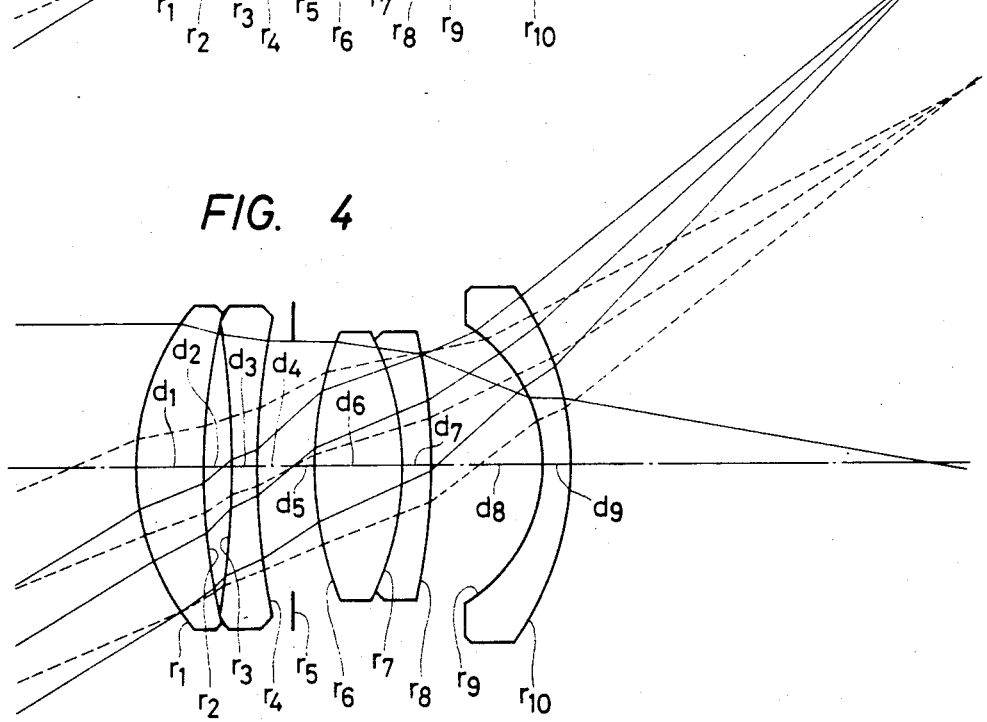
FIG. 4 shows a sectional view illustrating composition of Embodiment 6 of the present invention.

The Embodiment 6 has the lens composition shown in FIG. 4 in which the third lens component is designed as a cemented doublet having the cemented surface convex on the image side. Power of this cemented surface is so set as to satisfy the condition (7).

Figure 5:
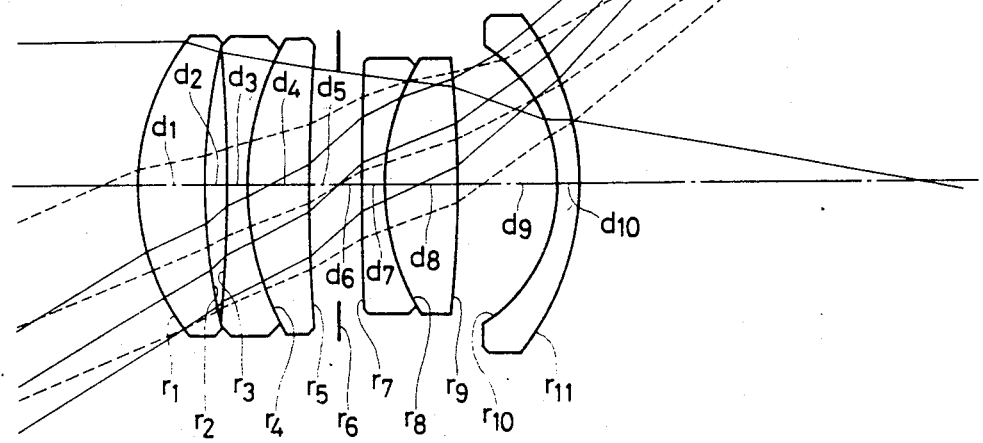
FIG. 5 shows a sectionsl view illustrating composition of Embodiment 7 of the present invention; and FIG. 6 through FIG. 12 shows curves illustrating averration characteristics of the Embodiments 1 through 7 respectively of the present invention.
Figure 6:
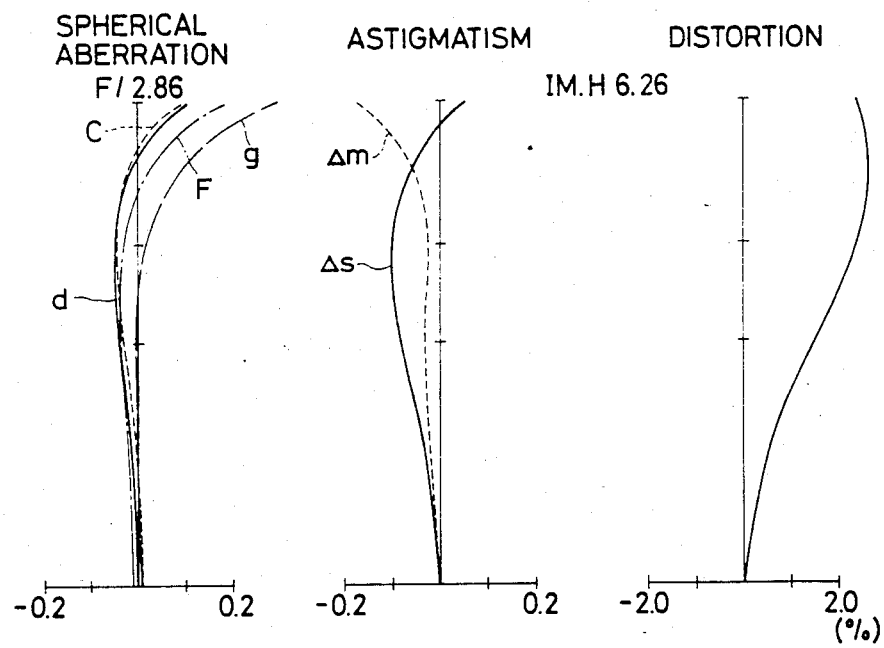
Figure 7:
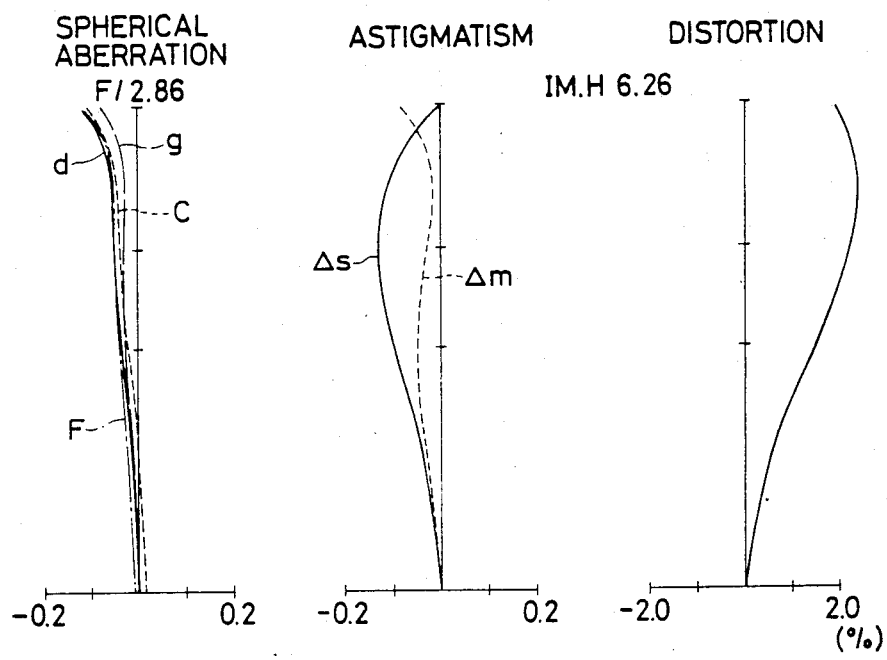
Figure 8:
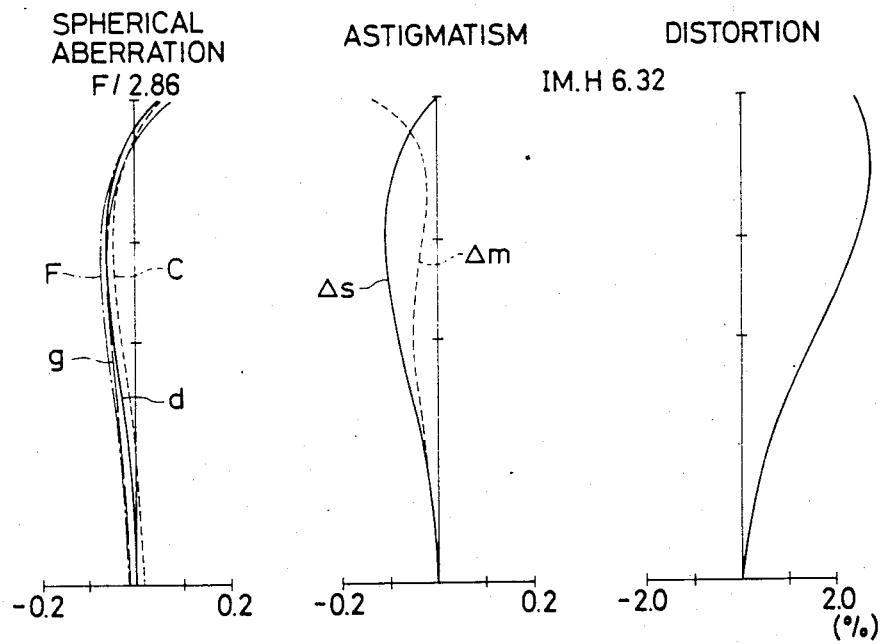
Figure 9:
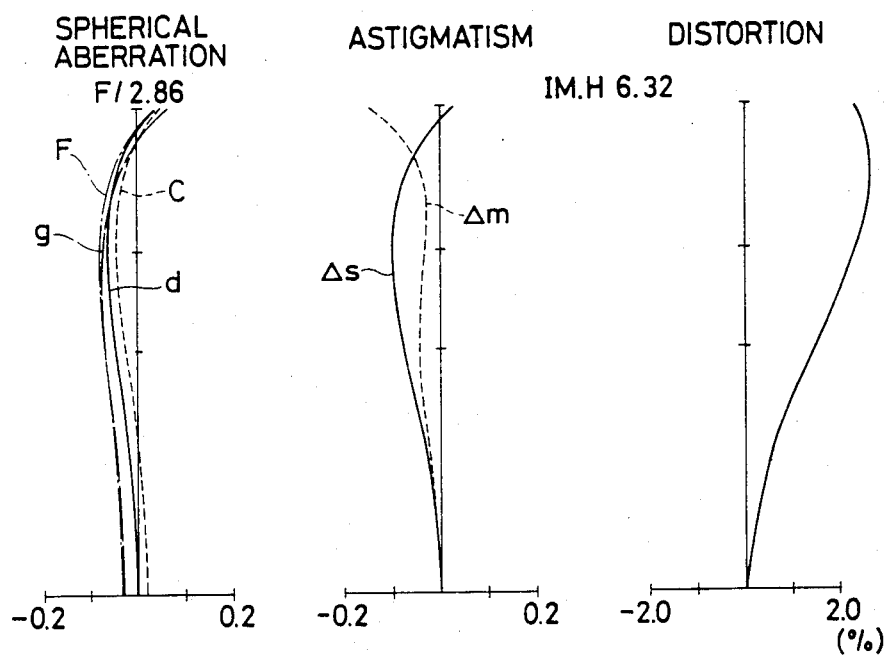
Figure 10:
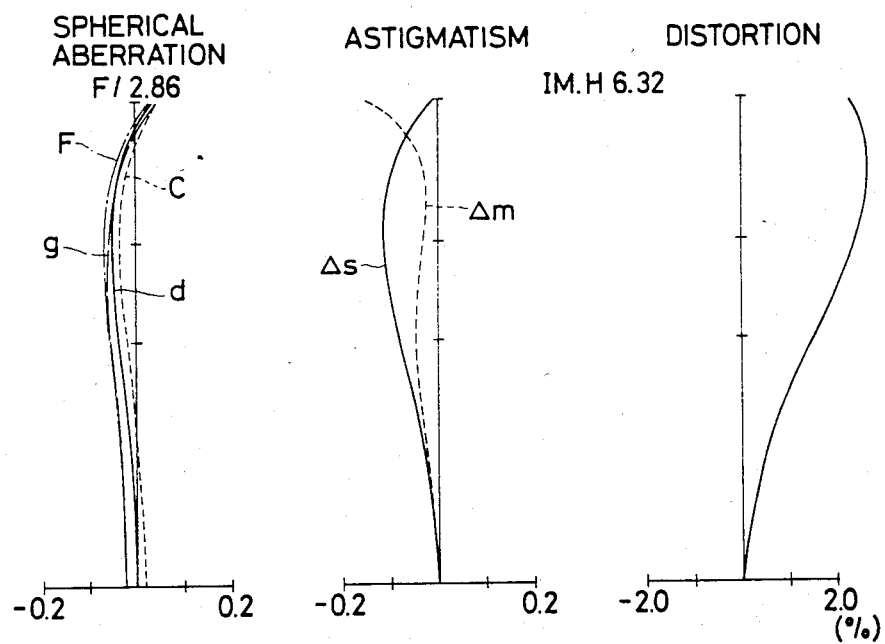
Figure 11:
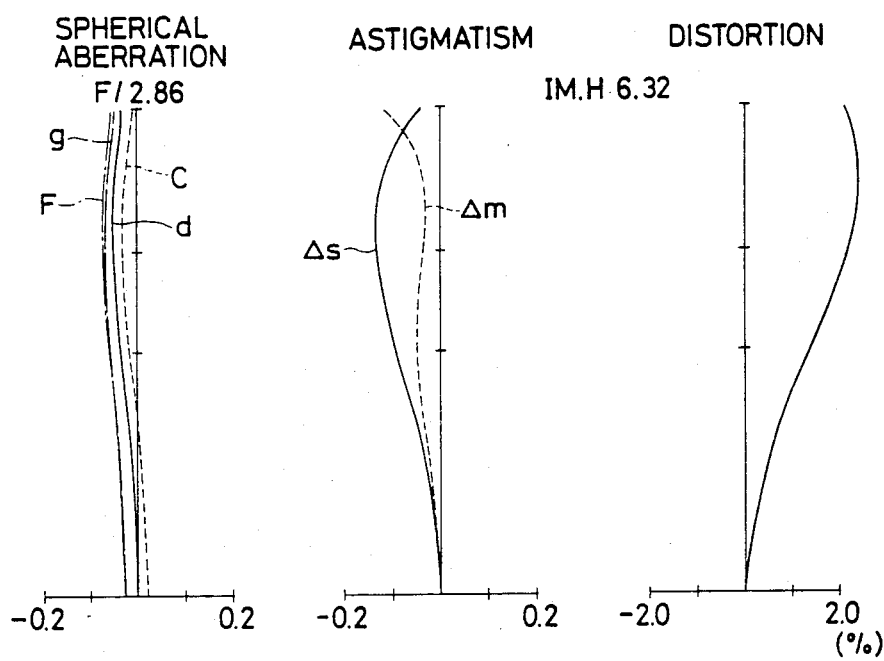
Figure 12:
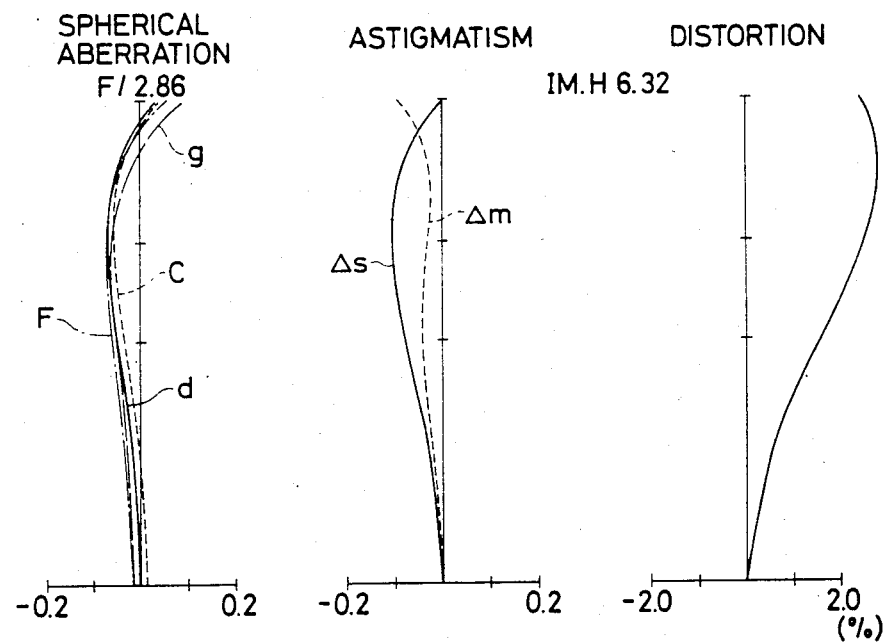

The Embodiment 7 has the lens composition shown in FIG. 5 in which both the second and third lens components are designed as cemented doublets.

As is understood from the foregoing descriptions, the photographic lens system according to the present invention has a field angle of 60°, an F number of 2.8, a telephoto ratio smaller than 1.0 and a very short total length. This photographic lens system has aberrations corrected favorably as shown in the accompanying aberration characteristic curves.

I claim:

1. A photographic lens system comprising a first positive meniscus lens component having a convex surface on the object side, a second lens component having negative refractive power, a third lens component having positive refractive power and a fourth negative meniscus lens component having a convex surface on the image side, at least one of said four lens components being designed as a cemented doublet and said lens system being so designed as to satisfy the following conditions (1) through (3) and (8):

$$0.15f < |r_{c1}| < 0.5f \quad (1)$$

$$0.23f < r_1 < 0.4f \quad (2)$$

$$1.5 < |r_a/r_b| < 5.5 \quad (3)$$

$$0.7f < |r_a| < 5.0f \quad (4)$$

wherein the reference symbol f represent focal length of said lens system as a whole, the reference symbol $r_1$ designates radius of curvature on the object side surface of said first lens component, the reference symbol $r_a$ denotes radius of curvature on the object side surface on said second lens component, the reference symbol $r_b$ represents radius of curvature on the image side surface of said third lens component and the reference symbol $r_{ci}$ designates radius of curvature on the ith cemented surface.

2. A photographic lens system according to claim 1 wherein said second lens component is designed as a cemented doublet comprising a biconcave lens element and a positive meniscus lens element having a convex surface on the object side, said lens system being so designed as to satisfy the following condition (4):

$$-0.95 < (n_T - n_O) \cdot f/r_{C1} < -0.65 \quad (4)$$

wherein the reference symbol $n_T$ and $n_O$ represent refractive indices of the positive menisucs lens element and biconcave lens element respectively of said second lens component, and the reference symbol $r_{C1}$ represents the radius of curvature of the cemented surface of said second lens component.

3. A photographic lens system according to claim 2 having the following numerical data:

| $f = 10.0$, $F/2.8$, $2\omega = 63°$ | | |
|---|---|---|
| $r_1 = 3.0633$ | | |
| $d_1 = 0.7537$ | $n_1 = 1.83481$ | $\nu_1 = 42.7$ |
| $r_2 = 7.2612$ | | |
| $d_2 = 0.3624$ | | |
| $r_3 = -12.7939$ | | |
| $d_3 = 0.2899$ | $n_2 = 1.78472$ | $\nu_2 = 25.7$ |
| $r_4 = 2.3634$ | | |
| $d_4 = 0.8117$ | $n_3 = 1.59270$ | $\nu_3 = 35.3$ |
| $r_5 = 9.6117$ | | |
| $d_5 = 0.3104$ | | |
| $r_6 = \infty$ (stop) | | |
| $d_6 = 0.1839$ | | |
| $r_7 = 5.7283$ | | |
| $d_7 = 0.7247$ | $n_4 = 1.62588$ | $\nu_4 = 35.7$ |
| $r_8 = -5.9487$ | | |
| $d_8 = 1.8223$ | | |
| $r_9 = -2.3029$ | | |
| $d_9 = 0.2899$ | $n_5 = 1.77250$ | $\nu_5 = 49.6$ |
| $r_{10} = -4.3465$ | | |
| $|r_{C1}| = |r_4| = 2.3634$, $r_a/r_b = r_3/r_8 = 2.1507$ | | |
| $(n_T - n_O) \cdot f/r_{C1} = (n_3 - n_2) \cdot f/r_4 = -0.81247$ | | |
| telephoto ratio 0.9797 | | | wherein the reference symbols $r_1$ through $r_{10}$ represent radii of curvature on the surfaces of the respective lens elements, the reference symbols $d_1$ through $d_9$ designate thicknesses of the respective lens elements and airspaces reserved therebetween, the reference symbols $n_1$ through $n_5$ denote refractive indices of the respective lens elements and the reference symbols $\nu_1$ through $\nu_5$ represent Abbe's numbers of the respective lens elements.

4. A photographic lens system according to claim 1 wherein said second lens component is designed as a cemented doublet comprising a positive meniscus lens element having a convex surface on the image side and a biconcave lens element, said lens system being so designed as to satisfy the following condition (5):

$$-0.65 < (n_O - n_T) \cdot f/r_{C1} < -0.35 \quad (5)$$

wherein the reference symbols $n_T$ and $n_O$ represent refractive indices of said positive meniscus lens element and said biconcave lens element respectively of said second lens component, and the reference symbol $r_{C1}$ represents the radius of curvature of the cemented surface of said second lens component.

5. A photographic lens system according to claim 4 having the following numerical data:

$f = 10.0$, $F/2.8$, $2\omega = 63°$

| | | | |
|---|---|---|---|
| $r_1 = 2.9677$ | | | |
| $d_1 = 0.8261$ | $n_1 = 1.72916$ | | $\nu_1 = 54.7$ |
| $r_2 = 6.1374$ | | | |
| $d_2 = 0.4058$ | | | |
| $r_3 = -9.5332$ | | | |
| $d_3 = 0.7246$ | $n_2 = 1.61700$ | | $\nu_2 = 62.8$ |
| $r_4 = -4.6128$ | | | |
| $d_4 = 0.2899$ | $n_3 = 1.84666$ | | $\nu_3 = 23.9$ |
| $r_5 = 22.6623$ | | | |
| $d_5 = 0.3085$ | | | |
| $r_6 = \infty$ (stop) | | | |
| $d_6 = 0.1668$ | | | |
| $r_7 = 5.5458$ | | | |
| $d_7 = 0.7536$ | $n_4 = 1.59270$ | | $\nu_4 = 35.3$ |
| $r_8 = -5.0312$ | | | |
| $d_8 = 1.3095$ | | | |
| $r_9 = -1.9877$ | | | |
| $d_9 = 0.2899$ | $n_5 = 1.65160$ | | $\nu_5 = 58.6$ |
| $r_{10} = -4.3896$ | | | |

$|r_{C1}| = |r_4| = 4.6128$, $r_a/r_b = r_3/r_8 = 1.8948$
$(n_O - n_T) \cdot f/r_{C1} = (n_3 - n_2) \cdot f/r_4 = -0.49788$
telephoto ratio 0.9797 wherein the reference symbols $r_1$ through $r_{10}$ represent radii of curvature on the surfaces of the respective lens elements, the reference symbols $d_1$ through $d_9$ designate thicknesses of the respective lens elements and airspaces reserved therebetween, the reference symbols $n_1$ through $n_5$ denote refractive indices of the respective lens elements and the reference symbols $\nu_1$ through $\nu_5$ represent Abbe's numbers of the respective lens elements.

6. A photographic lens system according to claim 1 wherein said third lens component is designed as a cemented doublet comprising a negative meniscus lens element having a convex surface on the object side and a biconvex lens element, said lens system being so designed as to satisfy the following condition (6):

$$0.15 < (n_T - n_O) \cdot f/r_{C1} < 0.45 \quad (6)$$

wherein the reference symbols $n_T$ and $n_O$ represent refractive indices of said biconvex lens element and said negative meniscus lens element respectively of said third lens component, and the reference symbol $r_{C1}$ represents the radius of curvature of the cemented surface of said third lens component.

7. A photographic lens system according to claim 6 having the following numerical data:

$f = 10.0$, $F/2.8$, $2\omega = 63°$

| | | | |
|---|---|---|---|
| $r_1 = 3.1498$ | | | |
| $d_1 = 0.8187$ | $n_1 = 1.72916$ | | $\nu_1 = 54.7$ |
| $r_2 = 7.7620$ | | | |
| $d_2 = 0.2632$ | | | |
| $r_3 = -22.5988$ | | | |
| $d_3 = 0.2924$ | $n_2 = 1.84666$ | | $\nu_2 = 23.9$ |
| $r_4 = 0.6345$ | | | |
| $d_4 = 0.4587$ | | | |
| $r_5 = \infty$ (stop) | | | |
| $d_5 = 0.5438$ | | | |
| $r_6 = 9.2066$ | | | |
| $d_6 = 0.2632$ | $n_3 = 1.51742$ | | $\nu_3 = 52.4$ |
| $r_7 = 2.1659$ | | | |
| $d_7 = 0.9213$ | $n_4 = 1.58875$ | | $\nu_4 = 51.2$ |
| $r_8 = -10.3153$ | | | |
| $d_8 = 1.5345$ | | | |
| $r_9 = -1.9663$ | | | |
| $d_9 = 0.2924$ | $n_5 = 1.56873$ | | $\nu_5 = 63.1$ |
| $r_{10} = -3.5151$ | | | |

$|r_{C1}| = |r_7| = 2.1659$, $r_a/r_b = r_3/r_8 = 2.1908$
$(n_T - n_O) \cdot f/r_{C1} = (n_4 - n_3) \cdot f/r_7 = 0.32933$
telephoto ratio 0.9883 wherein the reference symbols $r_1$ through $r_{10}$ represent radii of curvature on the surfaces of the respective lens elements, the reference symbols $d_1$ through $d_9$ designate thicknesses of the respective lens elements and airspaces reserved therebetween, the reference symbols $n_1$ through $n_5$ denote refractive indices of the respective lens elements and the reference symbols $\nu_1$ through $\nu_5$ represent Abbe's numbers of the respective lens elements.

8. A photographic lens system according to claim 6 having the following numerical data:

$f = 10.0$, $F/2.8$, $2\omega = 63°$

| | | | |
|---|---|---|---|
| $r_1 = 3.1087$ | | | |
| $d_1 = 0.7895$ | $n_1 = 0.81600$ | | $\nu_1 = 46.6$ |
| $r_2 = 8.6269$ | | | |
| $d_2 = 0.2924$ | | | |
| $r_3 = -45.8471$ | | | |
| $d_3 = 0.2924$ | $n_2 = 1.84666$ | | $\nu_2 = 23.9$ |
| $r_4 = 5.4974$ | | | |
| $d_4 = 0.4587$ | | | |
| $r_5 = \infty$ (stop) | | | |
| $d_5 = 0.3811$ | | | |
| $r_6 = 7.0711$ | | | |
| $d_6 = 0.2632$ | $n_3 = 1.51742$ | | $\nu_3 = 52.4$ |
| $r_7 = 2.3253$ | | | |
| $d_7 = 1.1697$ | $n_4 = 1.58267$ | | $\nu_4 = 46.3$ |
| $r_8 = -8.9675$ | | | |
| $d_8 = 1.3826$ | | | |
| $r_9 = -2.0356$ | | | |
| $d_9 = 0.3509$ | $n_5 = 1.72916$ | | $\nu_5 = 54.7$ |
| $r_{10} = -3.2616$ | | | |

$|r_{C1}| = |r_7| = 2.3253$, $r_a/r_b = r_3/r_8 = 5.1126$
$(n_T - n_O) \cdot f/r_{C1} = (n_4 - n_3) \cdot f/r_7 = 0.28061$
telephoto ratio 0.9883 wherein the reference symbols $r_1$ through $r_{10}$ represent radii of curvature on the surfaces of the respective lens elements, the reference symbols $d_1$ through $d_9$ designate thicknesses of the respective lens elements and airspaces reserved therebetween, the reference symbols $n_1$ through $n_5$ denote refractive indices of the respective lens elements and the reference symbols $\nu_1$ through $\nu_2$ represent Abbe's numbers of the respective lens elements.

9. A photographic lens system according to claim 6 having the following numerical data:

$f = 10.0$, $F/2.8$, $2\omega = 63°$

| | | | |
|---|---|---|---|
| $r_1 = 3.1551$ | | | |
| $d_1 = 0.7895$ | $n_1 = 1.72916$ | | $\nu_1 = 54.7$ |
| $r_2 = 8.5918$ | | | |
| $d_2 = 0.2924$ | | | |
| $r_3 = -23.2949$ | | | |
| $d_3 = 0.2924$ | $n_2 = 1.84666$ | | $\nu_2 = 23.9$ |
| $r_4 = 9.3780$ | | | |
| $d_4 = 0.4587$ | | | |
| $r_5 = \infty$ (stop) | | | |
| $d_5 = 0.5268$ | | | |
| $r_6 = 7.9042$ | | | |
| $d_6 = 0.2632$ | $n_3 = 1.51633$ | | $\nu_3 = 64.2$ |
| $r_7 = 2.1197$ | | | |
| $d_7 = 1.1696$ | $n_4 = 1.58904$ | | $\nu_4 = 53.2$ |
| $r_8 = -9.5086$ | | | |
| $d_8 = 1.3818$ | | | |
| $r_9 = -2.0110$ | | | |
| $d_9 = 0.3509$ | $n_5 = 1.72916$ | | $\nu_5 = 54.7$ |
| $r_{10} = -3.5087$ | | | |

$|r_{C1}| = |r_7| = 2.1197$, $r_a/r_b = r_3/r_8 = 2.4499$ $(n_T - n_O) \cdot f/r_{C1} = (n_4 - n_3) \cdot f/r_7 = 0.34302$
telephoto ratio 0.9883 wherein the reference symbols $r_1$ through $r_{10}$ represent radii of curvature on the surfaces of the respective lens elements, the reference symbols $d_1$ through $d_9$ designate thicknesses of the respective lens elements and airspaces reserved therebetween, the reference symbols $n_1$ through $n_5$ denote refractive indices of the respective lens elements and the reference symbols $\nu_1$ through $\nu_5$ represent Abbe's numbers of the respective lens elements.

10. A photographic lens system according to claim 1 wherein said third lens component is designed as a cemented doublet comprising a biconvex lens element and a negative menisucs lens element having a convex surface on the image side, said lens system being so designed as to satisfy the following condition (7):

$$0.10 < (n_O - n_T) \cdot f/r_{C1} < 0.35 \quad (7)$$

wherein the reference symbols $n_T$ and $n_O$ represent refractive indices of said biconvex lens element and said negative menisucs lens element respectively of said third lens component, and the reference symbol $r_{C1}$ represents the radius of curvature of the cemented surface of said third lens component.

11. A photographic lens system according to claim 10 having the following numerical data:

| $f = 10.0,$ | $F/2.8,$ | $2\omega = 63°$ |
|---|---|---|
| $r_1 = 3.1198$ | | |
| $d_1 = 0.8189$ | $n_1 = 1.72916$ | $\nu_1 = 54.7$ |
| $r_2 = 7.9231$ | | |
| $d_2 = 0.3510$ | | |
| $r_3 = -11.9395$ | | |
| $d_3 = 0.2925$ | $n_2 = 1.78472$ | $\nu_2 = 25.7$ |
| $r_4 = 7.9115$ | | |
| $d_4 = 0.4588$ | | |
| $r_5 = \infty$ (stop) | | |
| $d_5 = 0.2682$ | | |
| $r_6 = 4.6559$ | | |
| $d_6 = 1.0529$ | $n_3 = 1.56013$ | $\nu_3 = 47.0$ |
| $r_7 = -3.9317$ | | |
| $d_7 = 0.3802$ | $n_4 = 1.50048$ | $\nu_4 = 65.9$ |
| $r_8 = -6.6722$ | | |
| $d_8 = 1.4007$ | | |
| $r_9 = -2.0354$ | | |
| $d_9 = 0.3510$ | $n_5 = 1.72916$ | $\nu_5 = 54.7$ |
| $r_{10} = -3.8246$ | | |

$|r_{C1}| = |r_7| = 3.9317, r_a/r_b = r_3/r_8 = 3.0367$
$(n_O - n_T) \cdot f/r_{C1} = (n_4 - n_3) \cdot f/r_7 = 0.15172$
telephoto ratio 0.9884 wherein the reference symbols $r_1$ through $r_{10}$ represent radii of curvature on the surfaces of the respective lens elements, the reference symbols $d_1$ through $d_9$ designate thicknesses of the respective lens elements and airspaces reserved therebetween, the reference symbols $n_1$ through $n_5$ denote refractive indices of the respective lens elements and the reference symbols $\nu_1$ through $\nu_5$ represent Abbe's numbers of the respective lens elements.

12. A photographic lens system according to claim 1 wherein said second lens component and said third lens component are designed as cemented doublets respectively.

13. A photographic lens system according to claim 12 having the following numerical data:

| $f = 10.0,$ | $F/2.8,$ | $2\omega = 63°$ |
|---|---|---|
| $r_1 = 3.0426$ | | |
| $d_1 = 0.8187$ | $n_1 = 1.77250$ | $\nu_1 = 49.7$ |
| $r_2 = 7.1238$ | | |
| $d_2 = 0.2632$ | | |
| $r_3 = -26.4685$ | | |
| $d_3 = 0.2924$ | $n_2 = 1.72825$ | $\nu_2 = 28.5$ |
| $r_4 = 3.9081$ | | |
| $d_4 = 0.7310$ | $n_3 = 1.48749$ | $\nu_3 = 70.2$ |
| $r_5 = 27.2801$ | | |
| $d_5 = 0.3801$ | | |
| $r_6 = \infty$ (stop) | | |
| $d_6 = 0.2865$ | | |
| $r_7 = 28.2087$ | | |
| $d_7 = 0.2632$ | $n_4 = 1.47069$ | $\nu_4 = 67.4$ |
| $r_8 = 2.7853$ | | |
| $d_8 = 0.9211$ | $n_5 = 1.63930$ | $\nu_5 = 44.9$ |
| $r_9 = -9.8326$ | | |
| $d_9 = 1.2270$ | | |
| $r_{10} = -2.0517$ | | |
| $d_{10} = 0.2924$ | $n_6 = 1.88300$ | $\nu_6 = 40.8$ |
| $r_{11} = -3.2353$ | | |

$|r_{C1}| = |r_4| = 3.9081, |r_{C2}| = |r_8| = 2.7853$
$r_a/r_b = r_3/r_9 = 2.6919$
telephoto ratio 0.9883 wherein the reference symbols $r_1$ through $r_{11}$ represent radii of curvature on the surfaces of the respective lens elements, the reference symbols $d_1$ through $d_{10}$ designate thicknesses of the respective lens elements and airspaces reserved therebetween, the reference symbols $n_1$ through $n_6$ denote refractive indices of the respective lens elements and the reference symbols $\nu_1$ through $\nu_6$ represent Abbe's numbers of the respective lens elements.

* * * * *